United States Patent
Pellenc et al.

(10) Patent No.: US 9,572,370 B2
(45) Date of Patent: Feb. 21, 2017

(54) METHOD AND DEVICE FOR DYNAMICALLY TREADING FRUIT

(75) Inventors: Roger Pellenc, Pertuis (FR); Magali Bes, Saint Marcel sur Auda (FR); Alain Samson, Villeneuve les Maguelone (FR); Jean-Michel Salmon, Castelnau le Lez (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 503 days.

(21) Appl. No.: 14/234,605

(22) PCT Filed: Aug. 8, 2012

(86) PCT No.: PCT/FR2012/000333
§ 371 (c)(1),
(2), (4) Date: Apr. 24, 2014

(87) PCT Pub. No.: WO2013/030468
PCT Pub. Date: Mar. 7, 2013

(65) Prior Publication Data
US 2014/0263767 A1 Sep. 18, 2014

(30) Foreign Application Priority Data
Aug. 30, 2011 (FR) ...................................... 11 02629

(51) Int. Cl.
*B02C 19/00* (2006.01)
*A23N 1/02* (2006.01)
(Continued)

(52) U.S. Cl.
CPC ............. *A23N 1/02* (2013.01); *B02C 13/1807* (2013.01); *B02C 13/1814* (2013.01); *B02C 19/00* (2013.01); *B30B 9/02* (2013.01)

(58) Field of Classification Search
CPC ... A23N 1/02; B02C 13/1807; B02C 13/1814; B02C 19/0025; B02C 19/0031; B02C 19/00; B30B 9/02
(Continued)

(56) References Cited

U.S. PATENT DOCUMENTS 582,873 A * 5/1897 Nilsson .................... A23N 4/20
241/275
1,427,457 A * 8/1922 Gillespie .................. A23N 5/08
241/275
(Continued)

FOREIGN PATENT DOCUMENTS

FR 1595035 * 7/1970
WO WO 94/29027 * 12/1994

*Primary Examiner* — Mark Rosenbaum
(74) *Attorney, Agent, or Firm* — Egbert Law Offices, PLLC

(57) ABSTRACT

Dynamic crusher for treading fruit, particularly grapes, with a treading chamber having, when considering the direction of the path followed by the fruit in the crusher, an upstream fruit-introduction opening, a downstream discharge opening for discharging the must that results from the treading, a rotary ejector that allows kinetic energy to be imparted to the fruit introduced into the treading chamber, and allows the fruit to be cast against a fixed fruit-bursting wall, wherein the rotary ejector is mounted such that it can rotate about a vertical axis and a fixed fruit-bursting wall is positioned around the rotary ejector or facing the peripheral edge thereof against which fruit is cast, rotation of which allows the fruit to be cast, under the effect of centrifugal force, against the fixed fruit-bursting wall, causing the fruit to burst. A method for dynamically treading fruit using such a crusher is also disclosed.

7 Claims, 9 Drawing Sheets

(51) Int. Cl.
*B30B 9/02* (2006.01)
*B02C 13/18* (2006.01)

(58) Field of Classification Search
USPC .................................................. 241/5, 275
See application file for complete search history.

(56) References Cited

U.S. PATENT DOCUMENTS 2,428,670 A * 10/1947 Hulse ................. B02C 13/1814
                                                                                          241/188.2
4,886,216 A * 12/1989 Goble ................. B02C 13/1814
                                                                                          241/152.1

* cited by examiner

METHOD AND DEVICE FOR DYNAMICALLY TREADING FRUIT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a method and device for dynamically treading fruit or even vegetables.

In particular, the invention is advantageously applicable to the bursting of grapes, beginning right with the crop of de-stemmed grapes or in whole bunches, for the elaboration of white, rosé or red wines.

2. Description of Related Art Including Information Disclosed Under 37 CFR 1.97 and 37 CFR 1.98.

In a vinification process at the end of which the grapes is transformed into wine, treading is the operation which consists of pressing or crushing the grapes to burst them open and to release their components in order to obtain a grape must which is in contact with the skins.

The invention is also applicable to the bursting of apples for cider production or of other fruit or even vegetables, for use in an ulterior process of producing juices or concentrates of these.

The objective is to achieve, through the present innovation, the bursting of fruit or even of certain vegetables, in order to increase exchanges between the liquid and solid phases within the whole grape must obtained in this manner which will be reused later, for instance in a maceration process.

With respect to vinification, the treading method and machine according to the invention consist of bursting the grape berries to obtain a grape must then intended for maceration, without crushing neither the pips nor the possibly present grape stalks or other plant debris (leaves, stems, . . . ), the crushing of which could release and diffuse substances undesirable for good vinification (release of oils or polyphenolic compounds in uncontrolled quantities).

Especially on the oenological level, what is sought is the largest contact area possible between the juice and the skin of the grapes, during the maceration process.

Crushing the grape berries will have these effects:
establishing contact with the grape must, of the yeast present on the outside surface of the skin of the berries, in the case of spontaneous vinification;
good maceration or exchange by dissolution of polyphenols (coloring matter, tannins, . . . ) residing primarily on the inner surface of the grape skin, during red wine production;
reducing the risk of having residual reducing sugars at the end of alcoholic fermentation.

This process of obtaining fermentative must from grapes can also be applied to other fruit containing seeds or pits, or even to vegetables.

In order to obtain a quality grape must and to extract, during the maceration phase, the maximum of polyphenolic compounds, it is necessary that the following conditions be met:
all berries without exception grape must be crushed;
the grape berries must not only be crushed to release the juice and seeds, but the skin grape must also be completely spread out so as to present the largest exchange surfaces possible for both its sides, inside and outside;
if the skin folds over itself after bursting, the grape juice must be able to infiltrate and circulate freely over the entire surface of the inside and outside of the skin It is in effect necessary to extract from the skin surface all compounds that are indispensable to vinification such as yeast and polyphenols (coloring matter, tannins, . . . );
under no circumstances must the pips or pieces of stalks or vegetable debris be crushed or their integrity is impaired in order to avoid the release of substances that are undesirable for the quality of the grape must.

Mechanical wine-presses have been available commercially for many years. They have superseded the age-old operation of treading by hand or foot which consisted of crushing, between the fingers or with the feet, the grape bunches brought in by manual harvest. For the most part they are being built, based on the principle of crushing berries between two more or less notched rolls rotating in opposite directions to each other. The differences between the solutions proposed by the manufacturers have to do with the geometry of the rolls or their notching, but the principle remains basically the same.

The rolls are made of food materials (rubber, polyurethane) and particularly not of hard materials (steel, stainless steel for example) to limit the effects of crushing seeds, plant or other organic debris.

Most of these systems allow adjusting the distance between the rolls, to increase or reduce the crushing of the grape berries, but also to adapt to the size of the grapes (which varies for different vine-stocks) or to the flow of fruit to be processed.

In consideration of their principle of mechanical crushing of the berries (rolling mill system, calendering), these wine-presses do indeed let these berries be crushed in order to release the juice, pulp and seeds But their major disadvantage remains that the berry opens only over a small surface, sufficient to evacuate its content through the wine-press. In effect, by passing through the wine-press the berry is progressively crushed. The pressure thereby generated inside the fruit makes the skin split open, generally where it is attached to the pedicel. After the exit of the grape components and the passage through the wine-press, the grape skin collapses on itself and, during the maceration process, limits the exchange surface between the juice and the inside wall of the berry skin This fact induces a longer maceration process (in order to extract as much as possible of the active components located at the inside of the skin turned back on itself), and of less quality in oenological terms.

Considering the design of these wine-presses, a fixed distance separates the two rolls of the wine-press during the treading. This distance may or may not be adjustable to adapt it to the average size of the berries and the intensity of the desired treading. So it is this distance which defines the minimum size of the grape that will be pressed between the rolls. Grapes and objects of smaller size than the distance between the rolls can therefore pass undamaged, while all other objects are being systematically pressed between the rolls.

Now, in a grape harvest, the size of the grapes is not constant, but depends on the vine-plant, and also on the degree of ripeness of the grapes. Thus, there will always be a not insignificant proportion of grapes with a diameter smaller than the distance between the two rolls, grapes which will therefore not be crushed and which will be unable to participate efficiently in the maceration process. Therefore, if one wants to subject almost all grapes to treading, one is obliged to reduce the distance between the rolls, at the cost of having to risk crushing or breaking down, in their entirety, seeds or plant material such as grape stalks.

In this case, the disadvantage of this type of equipment is that the output is linked to the distance between the rolls, for a given roll length. A significant increase of this output can therefore lead to degrading the treading quality.

On the other hand, one knows, for example in the elaboration of fruit juices, how to achieve the separation of liquid and solid matters of fruit, using centrifugation methods and machines.

However, for the application of these methods and machines, it is indispensable to first perform a grinding operation of all parts of the fruit, consequently including fruit pits or seeds, so as to then be able to extract the liquid parts of the grape must resulting from this grinding operation, by centrifugation, through a filter rotating at high speed.

In the FR-1.595.035 document a grape treader is described. According to this document, crushing of the berries is achieved by using a rotary beater with radial blades, so that this crushing operation is obtained through the beating action exerted directly on the berries by said blades. The rotary beater is not used to impart any kinetic energy to the berries but to make them burst through successive strokes by these blades, along a tunnel. There is no effect of centrifugal acceleration in a single level of fruit.

In the U.S. Pat. No. 4,957,043 document, a fruit disintegration device is described which includes a chamber with an inlet opening and an outfeed canal, this chamber containing a drive rotor to accelerate the speed of the fruit around a circular trajectory and then to discharge the fruit through said tangential outfeed channel into a separation chamber where the fruit is crushed on a fixed wall away from the rotor.

According to this document, the fruit is poured into a chamber in which a vertical rotor consisting of a part with a U profile is mounted so that it rotates around a horizontal axis. The fruit dumped by an infeed device is introduced between the longitudinal blades of this U-shaped rotor, and, under the effect of centrifugal force the fruit is ejected one by one into a channel leading to a separation chamber in which a fixed wall is installed facing the exit of the channel and against which the fruit propelled by kinetic energy is crushed. It would seem that a single fruit is ejected into the connecting channel whenever one of the open ends of the rotor appears opposite the entrance of said channel Such a device cannot be contemplated, nor is it applicable, on a practical level, to the treading of small fruit such as grapes or other berries, if one considers that the passage of the latter, one by one, from the chamber of acquisition of kinetic energy towards the separation chamber over a connecting channel would require an excessively long time, which is completely incompatible with the treading of grapes coming in from the harvest. On the other hand, a portion of the kinetic energy imparted by the rotor is dissipated during the passage of the fruit through the connecting channel The performance of this device would be clearly insufficient for applying it to grape treading. Finally, the fruit finds itself projected at a right angle to the fixed crushing plane, since such a process does not permit a development of the fruit skin which is indispensable for maceration in the wine-making process. This orthogonal projection of the grapes leads in fact to grapes crushing on themselves to release their components with, as a result, an effect that is identical to that obtained by traditional treading by means of machines with rollers, which is to say the folding of the grape skin on itself instead of being developed in the grape must.

As previously indicated, the invention is essentially and advantageously usable for achieving the separation of the liquid and solid phases of juicy fruit, in particular of fruit in the form of berries, such as grapes. However, we do not exclude the application of the invention to treading of certain vegetables, by means of adaptations of the treaders, depending on the nature of the vegetables to be processed. Under these conditions, the word "fruit", or even the word "berry" should be considered as equivalent to the term "vegetable" in the description which follows and in the claims.

The aim of the present invention is precisely to remedy the aforementioned disadvantages of treading devices with rollers and its goal is to make available to professionals interested in the utilization of this type of equipment, a dynamic wine-press allowing complete crushing of the fruit, berries or vegetables passing through it, and to release their liquid and solid matter, in order to constitute a high-quality grape must, as a preamble to ulterior operations of maceration or fermentation.

BRIEF SUMMARY OF THE INVENTION

According to the invention, this objective has been achieved, thanks to:

A process according to which the fruit is dumped into a treading enclosure and received on a rotary ejector, the fruit being endowed with kinetic energy under the effect of the centrifugal force communicated by the rotation of said rotary ejector and projected against a fixed bursting wall, at a determined speed so that the contact of the fruit with said fixed bursting wall occurs in the form of a shock or impact causing the bursting of the fruit, this process being remarkable in that the fruit is received on a rotary ejector mounted so it rotates around a vertical axis, and is projected, under the effect of the centrifugal force resulting from the rotation of this rotary ejector, against a fixed bursting wall surrounding said rotary ejector or positioned opposite the peripheral edge of projection of the latter.

A dynamic wine-press including a treading enclosure featuring, looking in the direction of the trajectory of the fruit in the treader, an upstream opening for dumping the fruit, and a downstream opening for evacuating the grape must resulting from the treading of the fruit, featuring also a rotary ejector capable of imparting kinetic energy to the fruit transported on said rotary ejector, and to project said fruit against a bursting wall, this treader being remarkable in that the rotary ejector is mounted in rotation around a vertical axis, and a fixed bursting wall is positioned around said rotary ejector or facing the peripheral edge of projection of the latter, the rotation of which causes the fruit to be projected, under the effect of the centrifugal force imparted to it by this rotation, against said fixed bursting wall, in the form of shocks or impacts provoking the bursting of the fruit.

According to another characteristic arrangement, the fruit is projected tangentially to the internal surface of impact of the fixed bursting wall.

According to a preferred embodiment, the fruit is projected tangentially to the curved surface of the fixed bursting wall which is cylindrical, tapered, or polygonal.

According to an advantageous embodiment, the rotary ejector is constituted by a rotating plate positioned horizontally, preferably circular and/or flat.

According to a preferred embodiment, the ejection edge of the fixed bursting wall is circular.

According to another preferred embodiment, the fixed bursting wall is rigid.

According to another characteristic arrangement, the upper surface of the rotary plate is provided with angularly spaced guiding fins and extending from the central part of the plate to the periphery of the latter.

Advantageously, said guiding fins have a curved (concave) shape.

According to another implementation, the rotary ejector is constituted by an inverted truncated cone.

According to another characteristic arrangement, the internal wall of the truncated cone is equipped with angularly spaced guiding fins extending from the low part of said truncated cone to the peripheral edge of projection of the latter.

According to another characteristic arrangement, the fixed bursting wall positioned around the rotary plate or facing the peripheral edge of projection of the inverted truncated cone presents a truncated conical shape.

According to another characteristic arrangement, a space is provided between the peripheral edge of projection of the rotary ejector and the fixed crushing wall.

According to an advantageous embodiment, a circular skirt is positioned below and in the continuity of the fixed bursting wall, this circular skirt being equipped on the inside with angularly spaced braking fins.

According to another characteristic arrangement of the treading method and the dynamic wine-press of the invention, means that are known as such make it possible to regulate the kinetic energy or the ejection speed of the fruit exiting the rotary ejector so as to allow the bursting of the fruit, but without bursting the seeds or other plant debris harder than the constituents of said fruit being treaded.

The method and the dynamic treader according to the invention provide in particular the following advantages:
  bursting the berries without crushing the seeds or the stalks or other plant debris which, when crushed, could release undesirable substances and diffuse them in the liquid phase;
  obtention of a quality grape must that is free of undesirable substances;
  bursting of all berries dumped into the treader, regardless of their size;
  obtention of a grape must in which the juice is in contact, under optimal conditions, with the internal and exterior surfaces of the skin of the fruit.
  a strong flow with excellent yield.

BRIEF DESCRIPTION OF THE DRAWINGS

The aims, characteristics and advantages mentioned above and still more will become clearer from the description below and the attached drawings in which.

Figure 1:
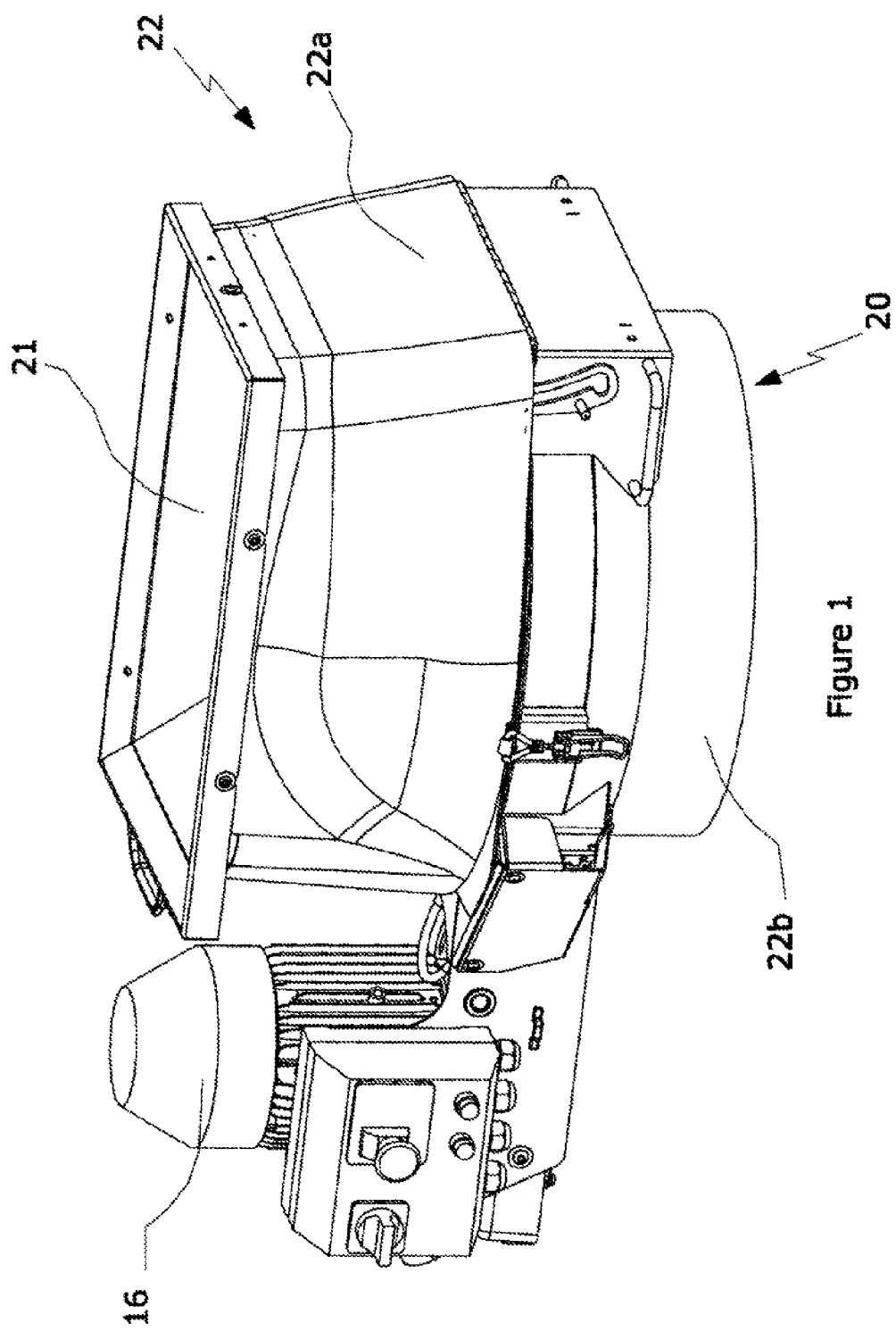
FIG. 1 is a perspective view of a first example of embodiment of the treader.
Figure 2:
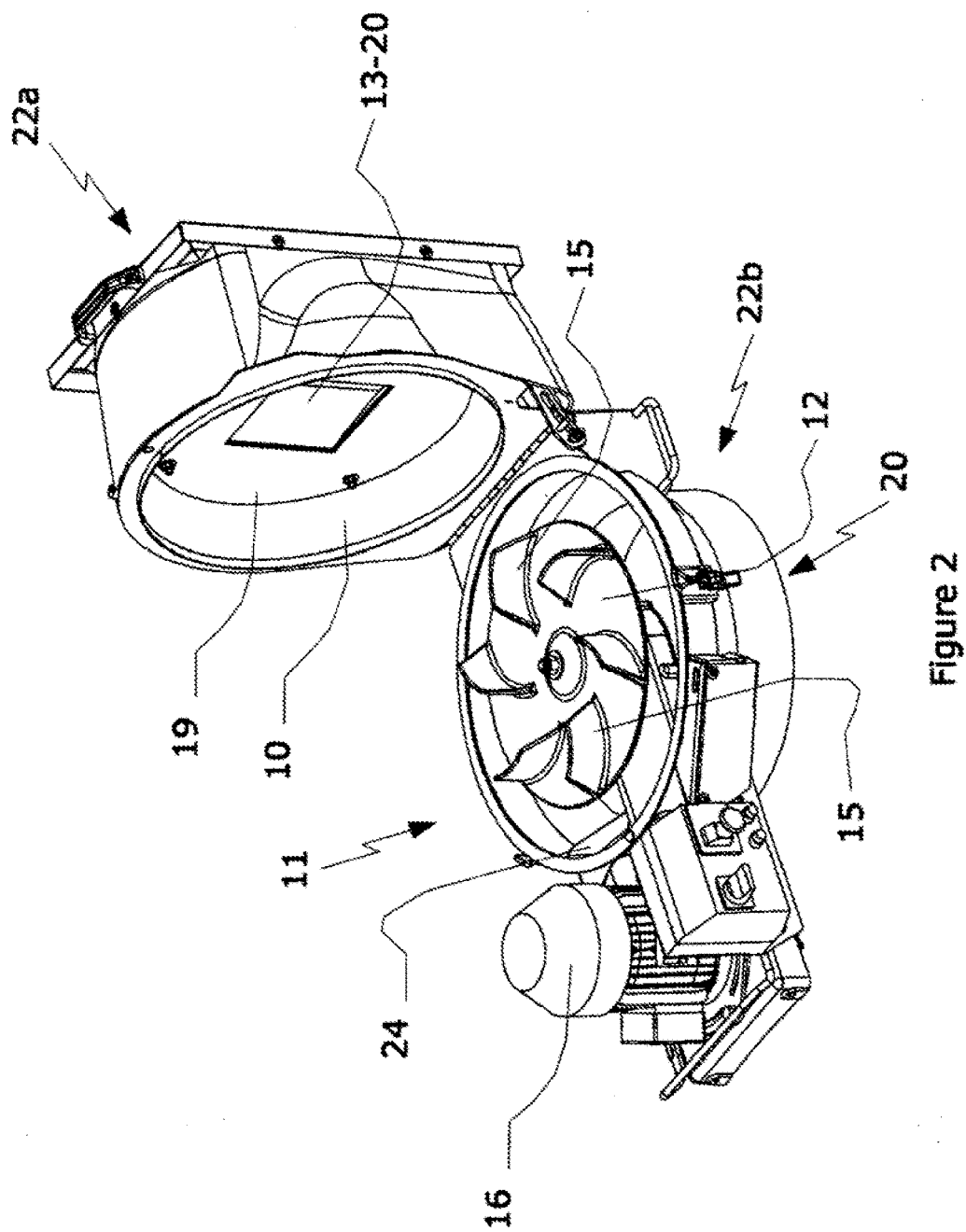
FIG. 2 is a perspective view showing the treader in opened position for cleaning the centrifugal rotary plate and the treading chamber.
Figure 3:
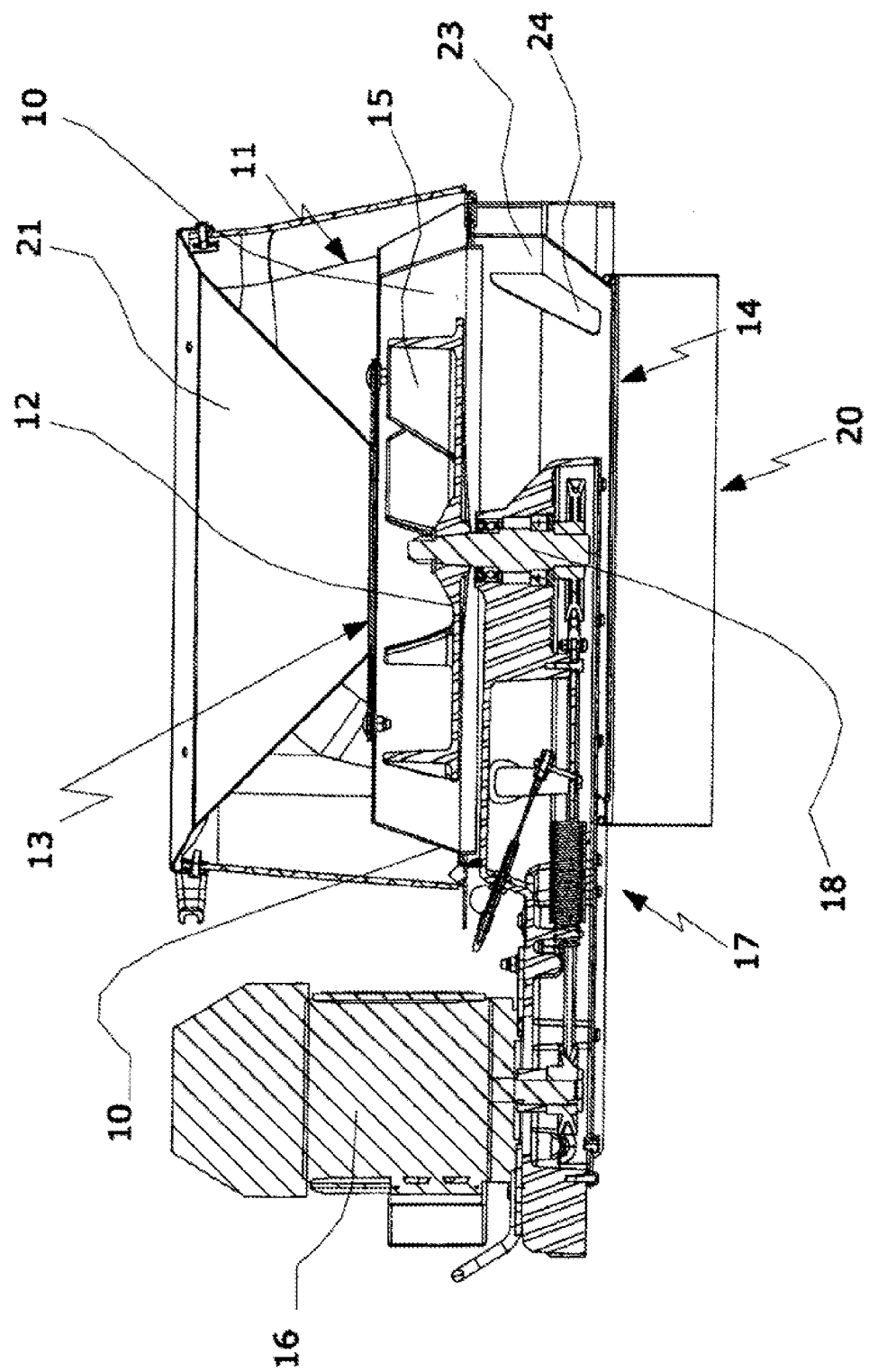
FIG. 3 is an axial section view of the treader.
Figure 4:
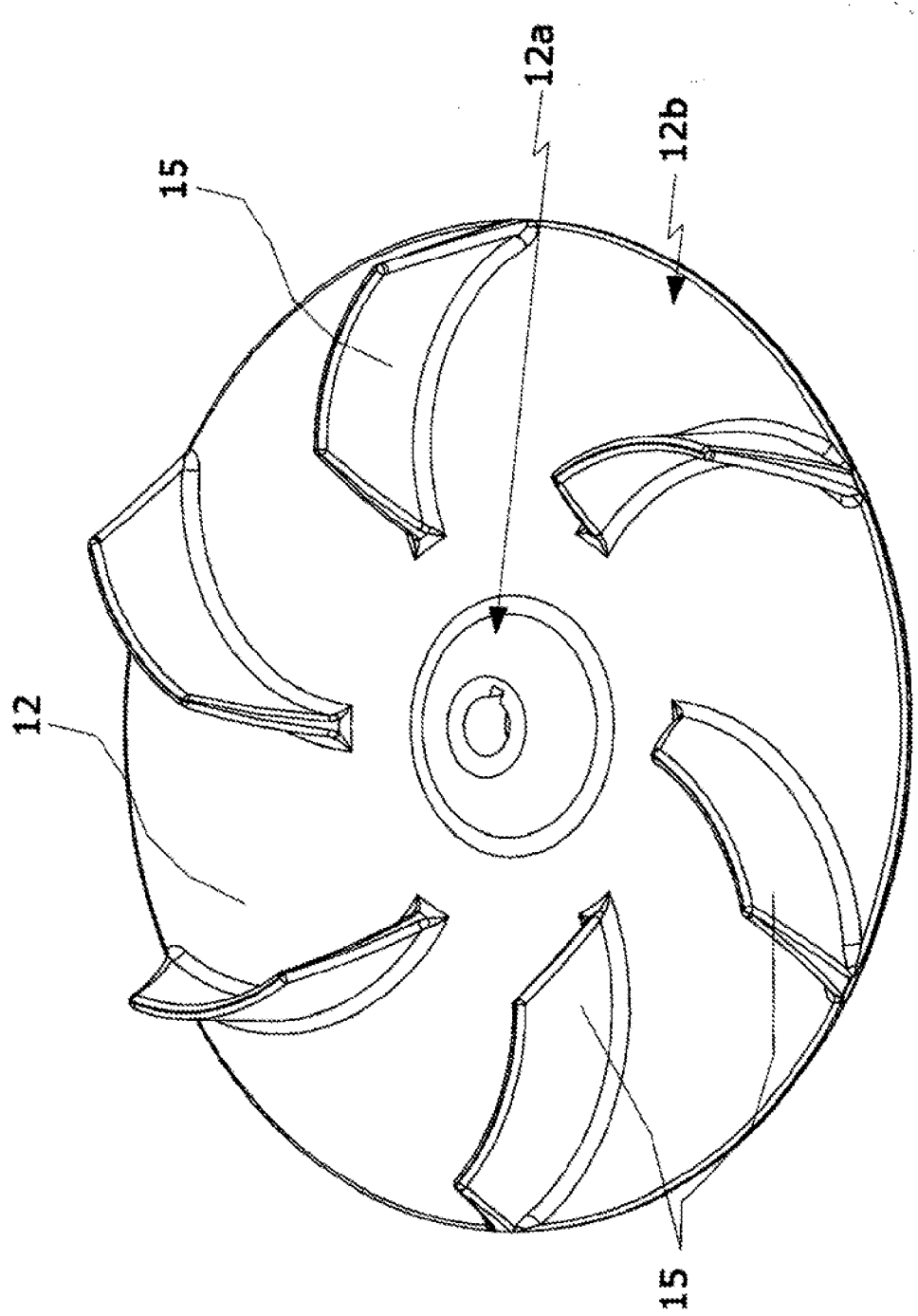
FIG. 4 is a perspective view of the rotary plate.
Figure 5:
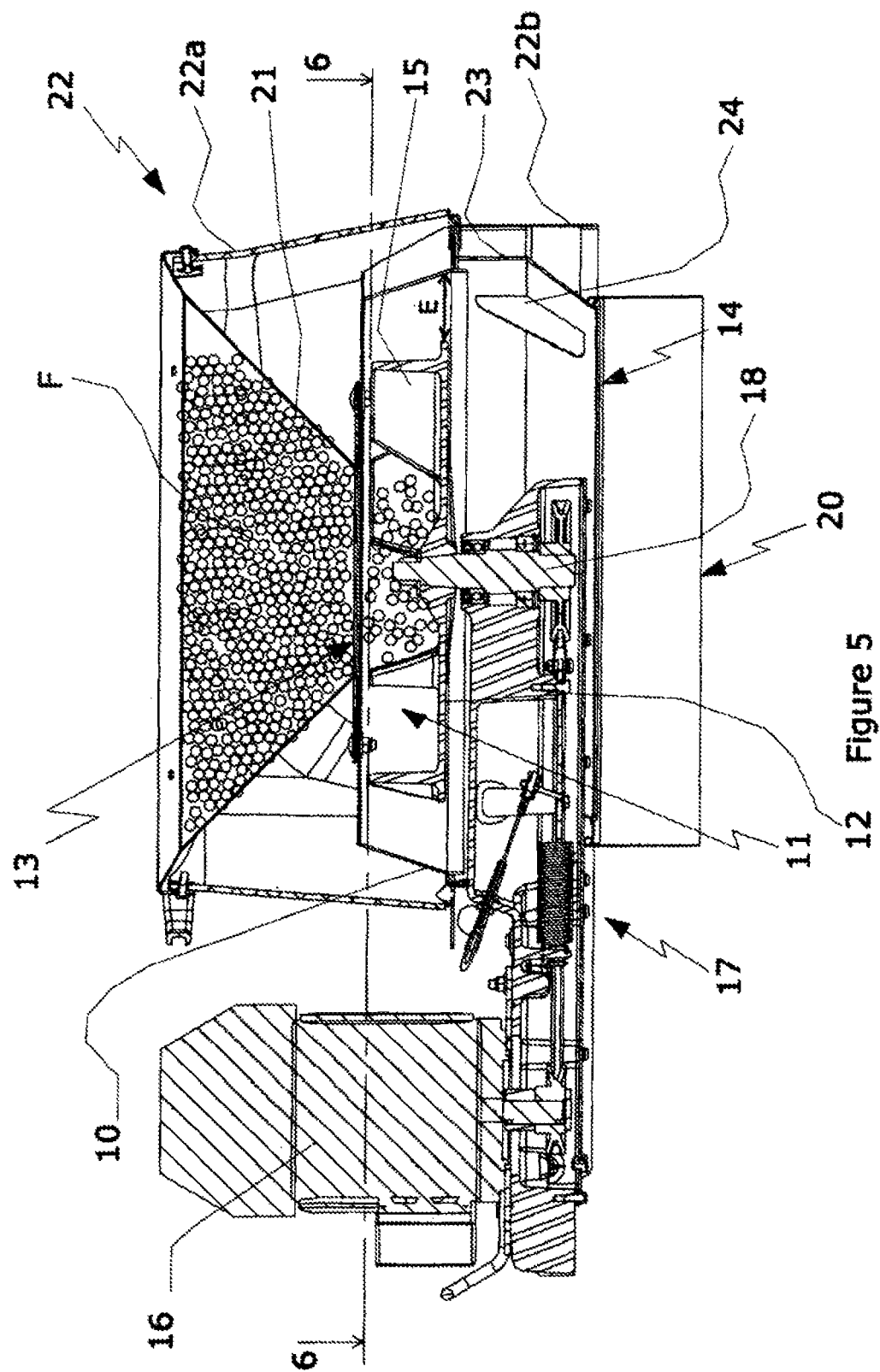
FIG. 5 is an analog view to FIG. 3 showing the treader in operation.
Figure 6:
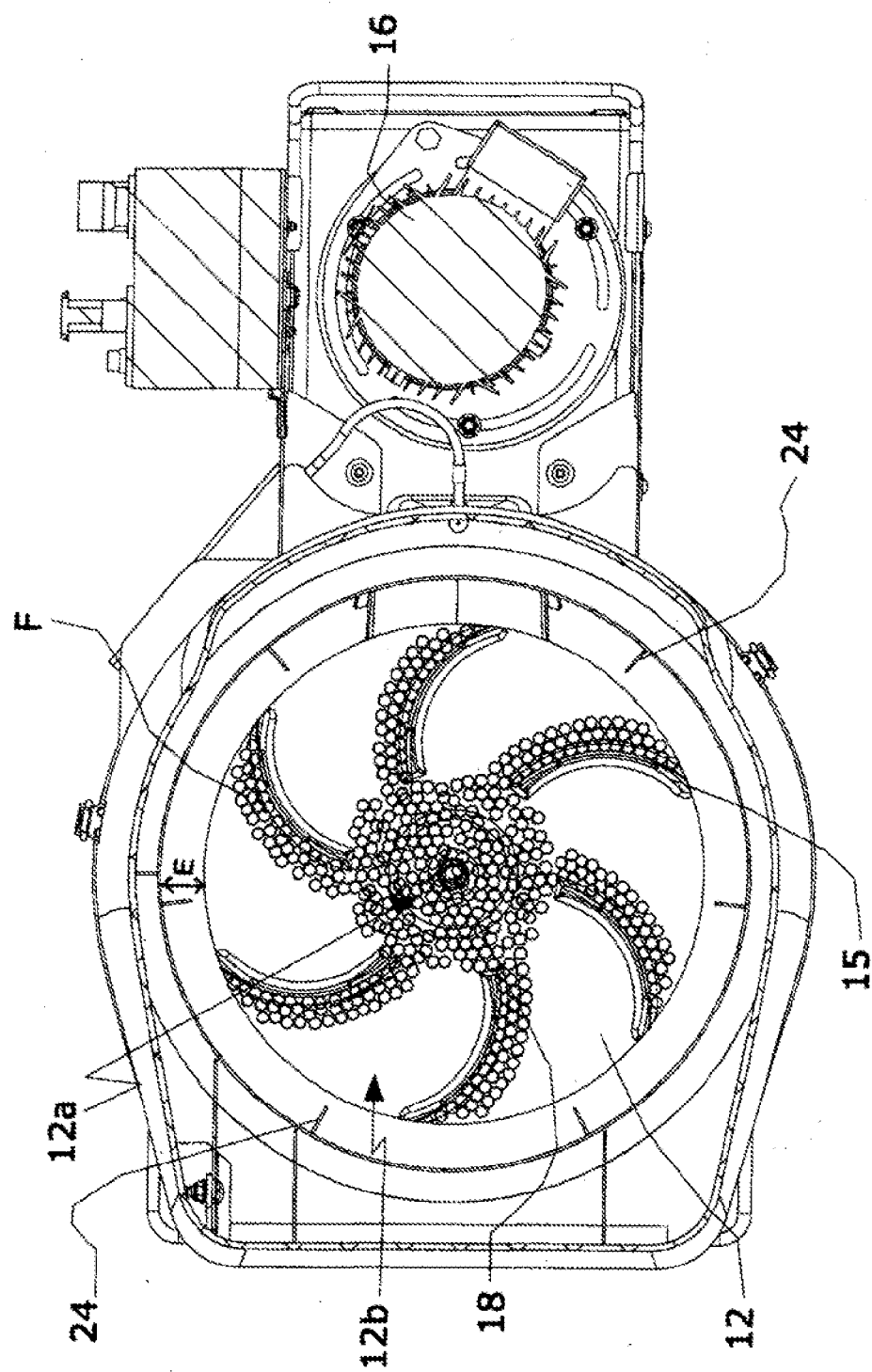
FIG. 6 is a plan view and section view along line 6-6 of FIG. 5.
Figure 7:
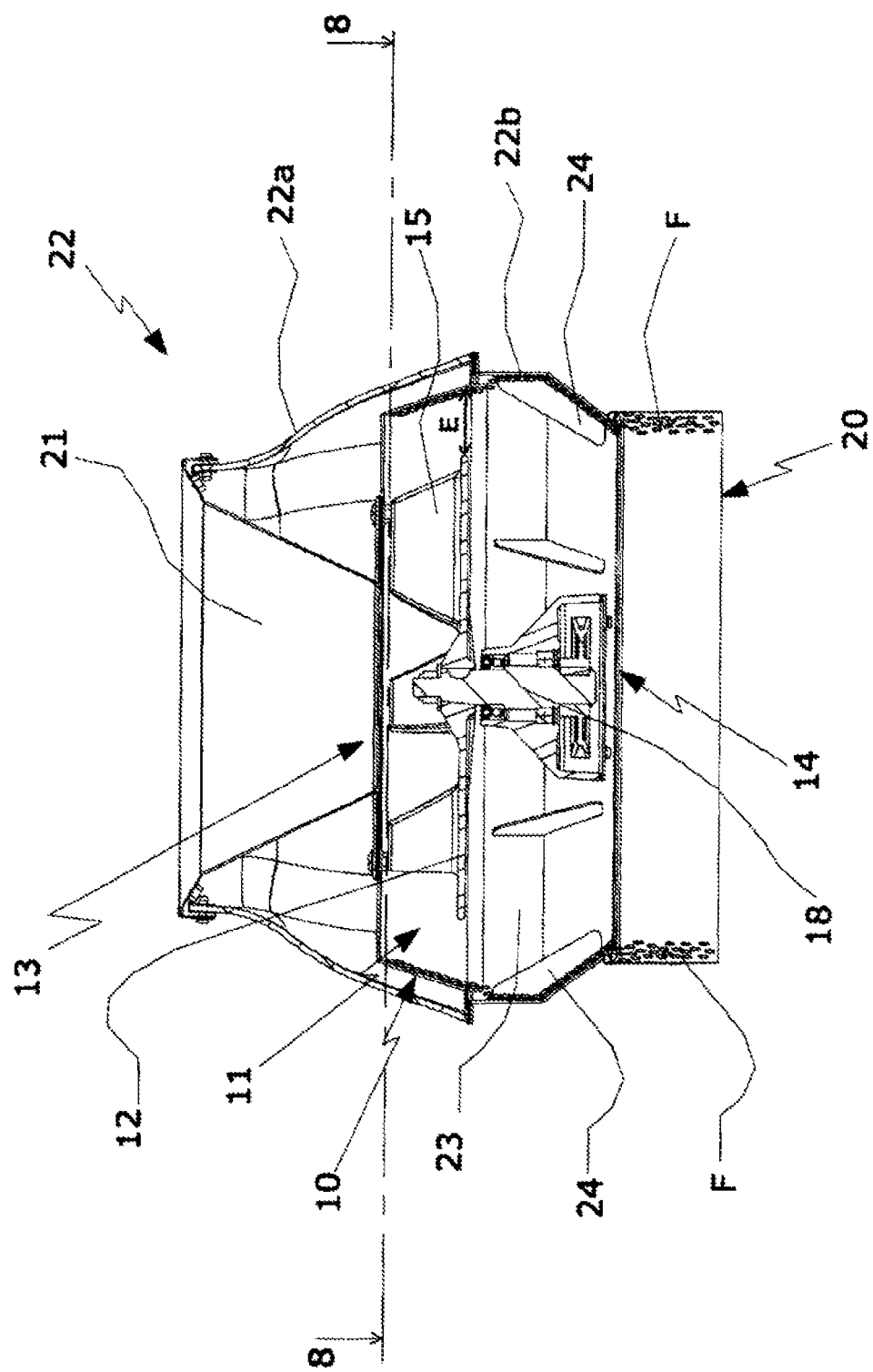
FIG. 7 is an analog view to FIG. 3, viewed perpendicularly, illustrating the treader in operation.
Figure 8:
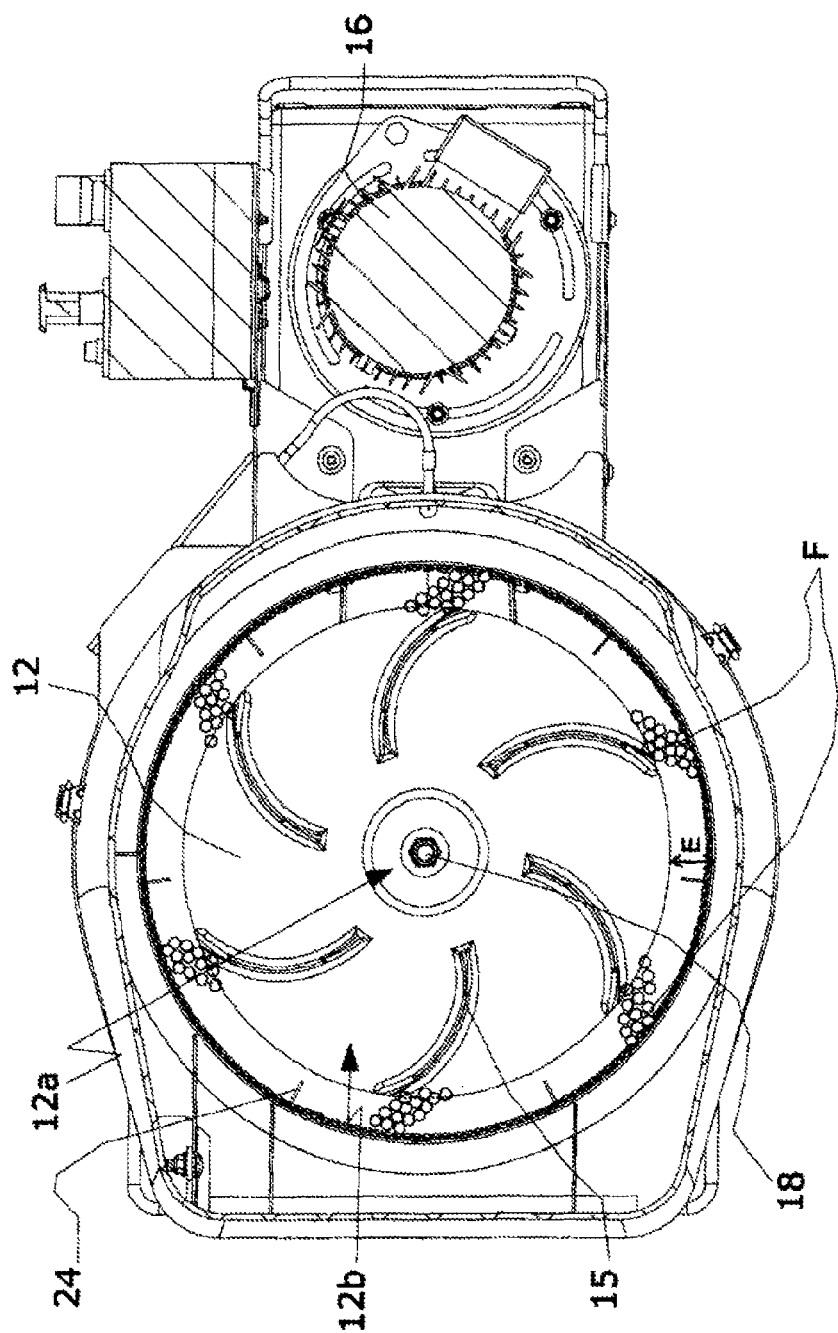
FIG. 8 is a plain view and section view along line 8-8 of FIG. 7.

Reference is made to said drawings to describe interesting, although by no means limiting examples of implementation of the treading method and of embodiment of the dynamic treader according to the invention.

DETAILED DESCRIPTION OF THE INVENTION

In the description below as well as in the claims the terms "upstream" and " downstream" refer to the direction of passage of the fruit and grape must through the treader.

According to the invention, separation of liquid and solid matters of the fruit is achieved through the transfer of kinetic energy between said fruit and a fixed bursting wall.

The dynamic treader according to the invention includes a treading enclosure 11, featuring, while looking in the direction of travel of fruit in the treader, an upstream infeed opening 13 for the fruit and a downstream outfeed opening 14 of the grape must resulting from the treading of the fruit, featuring also a rotary ejector 12, 12' for imparting kinetic energy to the fruit dumped into said treading enclosure 11, and for projecting said fruit against a fixed bursting wall 10, 10', and, according to a first characteristic arrangement, this treader is remarkable in that the rotary ejector is mounted so it rotates around a vertical axis 18 and a fixed bursting wall is positioned around said rotary ejector or facing the peripheral edge of projection of the latter, the rotation of which enables the fruit to be projected, under the effect of the centrifugal force imparted to it by this rotation, against said fixed bursting wall, in the form of shocks or impacts causing the bursting of the fruit.

According to the example of embodiment shown in FIGS. 1 to 8, the dynamic treader for the bursting of fruit, in particular of grapes, includes a treading enclosure 11 featuring an upstream infeed opening 13 for the fruit and a downstream opening 14 for the evacuation of the grape must resulting from the treading of said fruit, while looking in the direction of the travel of the fruit inside the treader.

Inside the treading enclosure 11 is mounted a rotary ejector 12 capable of imparting kinetic energy to the fruit F dumped on said rotary ejector and of projecting it against the fixed bursting wall 10 positioned around said rotary ejector 12.

According to this implementation, the rotary ejector is constituted by a rotating plate 12, onto which the fruit F falls, for example in the central part, dumped into the treading enclosure 11. This plate 12 is mounted so it rotates around a vertical axis 18 and it is positioned horizontally. It presents, preferably, a circular shape. Means of propulsion known as such permit the motorized drive in rotation of the ejection plate 12 at high speed, this speed being determined and adjustable to allow projecting the fruit, under the effect of kinetic energy imparted to it and of centrifugal force, against the bursting wall 10 positioned around the rotary plate. In this manner, contact of fruit F with said fixed bursting wall 10 takes place in the form of shocks or impacts leading to its bursting, without however causing the seeds or other undesirable components to burst.

The ejection plate 12 may have a flat shape and it is, for example, installed in the bottom of the treading enclosure.

A ring-shaped space is provided between the ejection edge 12b of the rotating plate 12 and the bursting wall 10 positioned around the latter. This ring-shaped space may have a width in the order of 30 to 40 mm, this dimension being given only as a non-limiting example.

The ejection plate 12 may be advantageously equipped, on its upper face, with a plurality of angularly spaced guide fins 15 extending from the central part 12a of said plate to its periphery. Advantageously these guide fins 15 have a curved concave shape, looking in the direction of rotation of plate 12. They may be of various height, depending on the dimensions of the treader, they themselves being dependent on the nature of the produce to be processed, for example a height in the order of 60 mm for treading of grapes with the berries presenting a diameter between 5 and 30 mm, depending on the vine-plants and their maturity.

The fins 15 may be made of rigid materials, of stainless steel for example, or of elastic or viscoelastic materials, for example polyurethane or food-grade rubber. These fins may be formed directly of the same material as the ejector properly speaking, or they may be attached on the latter.

Figure 9:
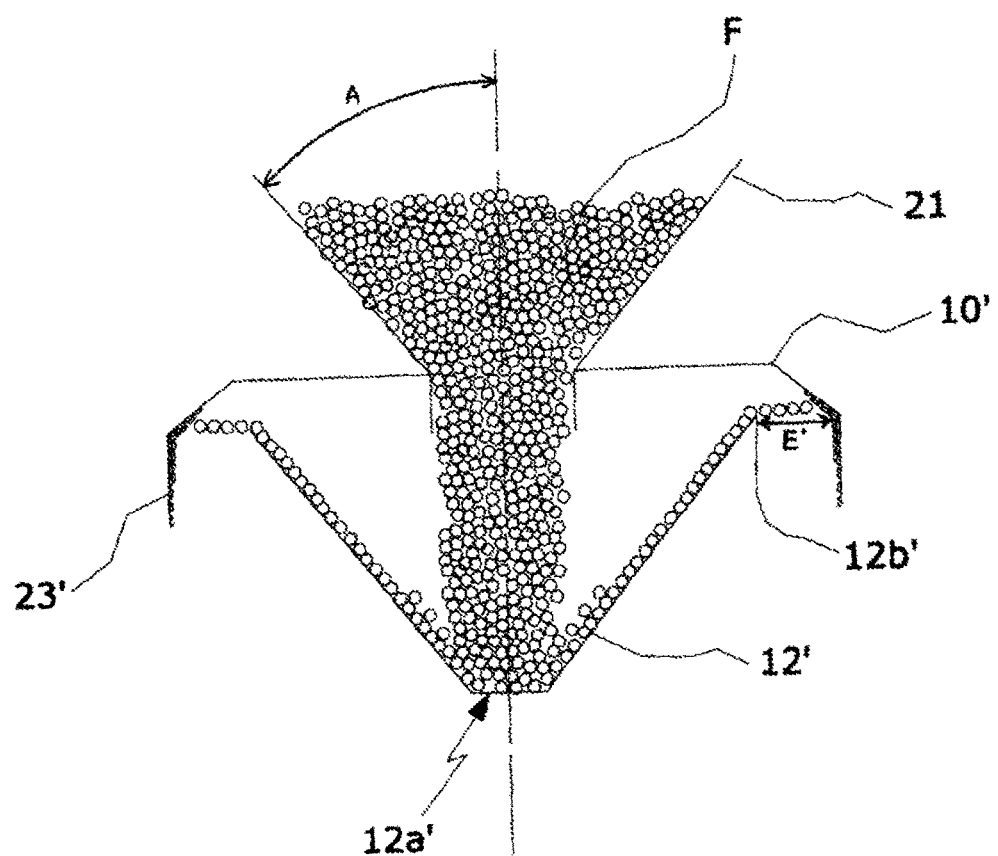
FIG. 9 is a schematic view of an example of embodiment of the treader with the rotary ejector in the shape of a truncated cone.

According to the example of embodiment shown in FIG. 9, the rotary ejector presents the shape of an inverted truncated cone 12'. The lateral wall of this truncated cone may present an angle of inclination A between 0° and 90° and, for example an angle of inclination in the order of 30°. The upper edge 12b' of the great basis of this inverted truncated cone constitutes the peripheral edge of ejection of this rotary ejector 12'.

A fixed bursting wall 10' is positioned around the upper ejection edge 12b' of the inverted truncated cone 12'. A ring-shaped space E' is provided between said upper ejection edge 12b' and said fixed bursting wall 10'. The drive in rotation of the rotary ejector (plate 12 or truncated cone 12') may be provided, in a manner known as such, by any appropriate motorization.

For example, as far as the ejection plate 12 is concerned, these means may include an electrical motor 16 and an appropriate transmission system 17 for the rotary drive of a vertical shaft 18 on which said plate may be attached, at a speed which may be constant or adjustable by means of any appropriate speed regulating system, preferably in a range between 800 and 2000 rpm.

The fixed bursting wall 10 is positioned around the rotary plate 12. This wall may be constituted by the lateral wall of the treader enclosure 11. Advantageously, this wall 10 is in the form of a truncated cone the upper part of which is closed by a horizontal wall 19 in which the upper opening 13 for infeed of the fruit is made and which is positioned upstream of plate 12, preferably near its central part 12a. This opening communicates with the outfeed opening 20 of a hopper 21 or other feeding apparatus.

According to an advantageous characteristic disposition of the invention, the fruit F is projected tangentially to the impact surface of the bursting wall 10 or 10'.

The fixed bursting wall 10 or 10' and more exactly the inside impact surface of this wall against which the fruit F is projected may have a circular, tapered or polygonal shape (constituted by a plurality of facets).

The frame 22 of the treader may be constituted by an upper portion 22a which is integral with the walls of the treader enclosure 11, and by a lower portion 22b on which said upper portion 22a is mounted, with a tipping capability, by means of any appropriate system of articulation. In this way, it is possible to swing the upper portion 22a around in order to open the treader and thus to have access to the rotary plate and the treading chamber for cleaning and maintenance purposes.

The rotary plate 12 is positioned above the large base of the conical bursting wall 10, which delimits the outfeed opening 14. A circular skirt 23 is positioned below and in the continuity of the fixed bursting wall 10. This circular skirt is equipped, on the inside, in the low part, with regularly spaced fins 24. The lower end of the circular skirt 23 delimits an opening that can be connected to a vat or tank for ulterior processing of said grape must, depending on the nature of the latter and the products to be elaborated from it.

The operation of the dynamic treader according to the invention can easily be understood by referring, for example, to the preferred and advantageous embodiment shown in FIGS. 1 to 8. The grape berries or the fruit F are brought up in a receiving trough connected at its end to the infeed opening of the treader via an infeed device constituted by the hopper 21.

At the exit from the hopper 21, the grape berries which have a relative speed of almost zero are dumped onto the rotary plate 12 at the level of its central part 12a. High speed rotation imparts to the berries progressive acceleration generated by the centrifugal force which projects them towards the outer edge of said plate. They acquire, in this way, as they leave the plate 12, a speed V which is a function of the rotary speed of the plate, and hence kinetic energy which is a function of this same speed V and the mass of the berries or fruit. When they leave the plate 12, under the effect of the centrifugal force, the berries or fruit possess the kinetic energy necessary to burst open upon contact with the fixed wall 10.

The liquid and solid phases containing the different constituents of the grape berries having thus been separated flow down by gravity along said fixed wall 10.

The rotational speed of the plate 12 is preferably constant, but should this be necessary, it can be adapted to other types of fruit or berries, and/or regulated depending on the desired output, and the level of ripeness of the fruit.

After their separation resulting from their being projected at high speed against the bursting wall 10, the constituents of the berries are slowed down by friction on said wall. They then flow by simple gravity along the circular skirt 23 positioned below and in continuation of the bursting wall 10, while the fins 24 positioned on the inside, in the low part of said circular skirt 23 serve to definitely halt the rotation of the separated constituents and to channel their flow in a vertical orientation in the axis of the treader.

As indicated before, the treader may, according to a preferred embodiment of the innovation process, feature a device for varying the rotational speed of the rotary ejector (plate 12 or inverted truncated cone 12') in order to adapt this speed to the fruit to be processed, to its degree of ripeness, or even to the product flow passing through the treader. Different shapes of rotors (rotary plates) or of acceleration blade profiles may be used, depending on the intensity of treading desired or on the type of product to be processed.

Operation of the embodiment shown in FIG. 9 is essentially identical to that of the device shown in FIGS. 1 to 8 which has just been described.

In this case, the berries dumped into the truncated ejector 12' are propelled in the direction of the lateral wall of the ejector and are drawn in an upward movement in the direction of the peripheral edge of projection 12b', under the effect of the centrifugal force and find themselves ejected against the fixed wall 10' positioned opposite said peripheral edge of projection, which leads to their bursting.

Preferably, the internal wall of the truncated ejector is provided with angularly spaced guide fins which extend from the low part 12a' to the peripheral edge of projection 12b' of said truncated ejector.

The invention claimed is:

1. A method for dynamically treading berries, the method comprising:
    dumping the berries into a treading enclosure;
    receiving the berries by a rotary ejector;
    rotating said rotary ejector so as to impart a kinetic force onto the received berries by a centrifugal force of said rotary ejector; and
    projecting the rotated berries against a fixed bursting wall at a predetermined speed such that a collision of the projected berries with said fixed bursting wall causes a shock or impact so as to burst the projected berries, said rotary ejector mounted in rotation around a vertical axis, said fixed bursting wall surrounding said rotary ejector or positioned opposite a peripheral projection of said rotary ejector.

2. The method of claim 1, the step of projecting comprising:
    tangentially projecting the rotated berries toward an inside surface of said fixed bursting wall.

3. The method of claim 1, the step of projecting comprising:
    tangentially projecting the rotated berries toward a curved surface of said fixed bursting wall.

4. The method of claim 1, said rotary ejector having a horizontally positioned plate.

5. The method of claim 1, said fixed bursting wall being rigid.

6. The method of claim 1, further comprising:
    regulating the kinetic energy or an ejection speed of the rotated berries so as to cause a bursting of the projected berries but not seeds of the projected berries or plant debris harder than the projected berries.

7. The method of claim 1, the berries being grapes.

* * * * *